United States Patent Office 3,020,143
Patented Feb. 6, 1962

3,020,143
METHOD OF REGULATING PLANT GROWTH
Henry Bluestone, University Heights, Ohio, assignor to Diamond Alkali Company, Cleveland, Ohio, a corporation of Delaware
No Drawing. Original application Jan. 23, 1957, Ser. No. 635,582, now Patent No. 2,953,573, dated Sept. 20, 1960. Divided and this application Sept. 28, 1959, Ser. No. 842,577
3 Claims. (Cl. 71—2.5)

This invention relates to a method of regulating plant growth utilizing 2-thiazolidinethione alkhalides, and more particularly relates to a method of regulating plant growth utilizing 2-thiazolidinethione methhalides, and still more particularly relates to such a method utilizing 2-thiazolidinethione methiodide.

This is a divisional application of my co-pending application Serial No. 635,582, filed January 23, 1957, now Patent No. 2,953,573.

The compounds of this invention have the following structure

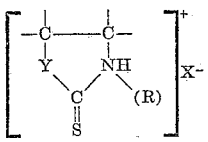

wherein X is a halogen, preferably iodine, Y is sulfur or oxygen, and R is an alkyl group, especially a lower alkyl such as methyl, ethyl, propyl, and the like.

More particularly, compounds of this invention preferably have the structure

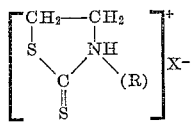

wherein R is a lower alkyl group, and X is a halogen, preferably iodine.

A specifically preferred compound of the above type is 2-thiazolidinethione methiodide. This compound exhibits utility in various applications where biological activity is advantageous as in phytocidal compositions, bactericides, defoliants, fungicides, and the like.

Other illustrative compounds in accordance with this invention comprise the methiodides of the following compounds:

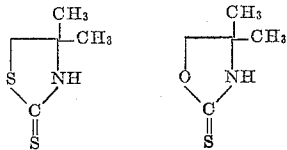

These compounds are less stable than 2-thiazolidinethione methiodide.

Compounds of this invention can generally be prepared by reacting carbon disulfide with ethylenimine or with ethanolamine and subsequently reacting the thus-formed 2-thiazolidinethione with an alkyl halide, notably methyl iodide. The term "alkyl" as used herein is intended to include various alkyl groups, including methyl, ethyl, propyl, and the like, e.g., especially the lower alkyl radicals. A detailed description of the preparation of these compounds can be found in my co-pending application Serial No. 635,582.

While the compounds of this invention exhibit biological activity as plant growth regulants, the present invention does not necessarily contemplate that their use will be restricted to such application but that they will be useful in a variety of applications. In this connection, it will be appreciated that when employed in biological applications, as well as other possible uses, they may well be utilized as formulations wherein they constitute but a minor amount of the total compositions. For example, they may be employed as essential ingredients in various compositions including a major proportion of one or more diluents, extenders, fillers, conditioners, solvents and the like, such as various clays, diatomaceous earth, talc, spent catalyst, alumina silica materials, and such liquids as water and various organic liquids such as acetone, kerosene, benzene, toluene, xylene and other petroleum distillate fractions or mixtures thereof. When liquid formulations are employed, or dry materials prepared which are to be used in liquid form, it is desirable in certain instances additionally to employ a wetting, dispersing or other surface-active agent to facilitate use of the formulation, e.g., Triton X–155 (alkyl aryl polyether alcohol).

The term "carrier" as employed throughout the specification and claims is intended to refer broadly to the materials constituting a major proportion of a biologically active or other formulation and hence includes finely-divided materials, both liquids and solids, as aforementioned, conventionally used in such an application.

In order that those skilled in the art may more completely understand the present invention and the preferred method by which the same may be carried into effect, the following specific examples are offered:

Example I

Using 2-thiazolidinethione methiodide, spore germination tests on glass slides are conducted via the test tube dilution method adopted from the procedure recommended by the American Phytopathological Society's committee on standardization of fungicidal tests. In this procedure the test chemical, in aqueous formulations at concentrations of 1000, 100, 10 and 1.0 p.p.m., is tested for its ability to inhibit germination of spores from 7 to 10-day-old cultures of *Alternaria oleracea* and *Sclerotenia fructicola*. These concentrations refer to initial concentrations before diluting four volumes with one volume of spore stimulant and spore suspension. Germination records are taken after 20 hours of incubation at 22° C. by counting 100 spores. The test compound is rated as to the concentration that inhibits germination of half of the spores, i.e., the so-called ED-50 value, in the test drops. Using this above procedure an ED-50 value of 10 to 100 p.p.m. is obtained against each organism with 2-thiazolidinethione methiodide, thus indicating a marked degree of fungicidal activity.

Example II

The compound 2-thiazolidinethione methiodide is employed in a test as a tomato foliage treatment against infection by the Early Blight fungus *Alternaria solani*. This method employs tomato plants 5 to 7 inches high of the variety Bonny Best. Duplicate plants are sprayed with 100 ml. of the test formulation (2000 p.p.m. test chemical—5% acetone—0.01% Triton X–155—balance water) at 40 pounds air pressure while being rotated on a turntable in a spray chamber. After the spray deposit is dry, the treated plants and comparable untreated controls (sprayed with formulation less toxicant) are sprayed with a spore suspension containing approximately 20,000 conidia of *Alternaria solani* per ml.

The plants are held in a saturated atmosphere for 24 hours at 70° F. to permit spore germination and infection before removal to the greenhouse. After 2 to 4 days, lesion counts are made on the three uppermost fully expanded leaves. The data are converted to percentage disease control based on the number of lesions obtained on the control plants.

Using the above procedure, a 63% control of the early blight fungus is observed thus indicating a marked degree of fungicidal effectiveness.

*Example III*

To detect root absorption and translocation, corn and bean plants growing in 4 inch pots are treated by pouring 51 ml. of a 2000 p.p.m. test formulation (2000 p.p.m. 2 thiazolidinethione methiodide—5% acetone—0.01% Triton X-155—balance water) into pots (102 mg. per pot or approximately equivalent to 128 lbs. per acre). The thus-treated plants are held in the greenhouse for at least 10 days before examination.

Using the above procedure, it is observed that 2-thiazolidinethione methiodide causes severe injury to the corn and kills the bean plants.

*Example IV*

Bean plants, variety Tendergreen, just as the trifoliate leaves are beginning to unfold, are sprayed with 100 ml. of an aqueous test formulation of 2-thiazolidinethione methiodide at a concentration of 6400 p.p.m. (0.64%). Records are taken 14 days after treatment and phytotoxicity is rated on a scale from zero for no injury to 11 for plant kill. Using the above procedure, it is observed that the bean plants are killed.

*Example V*

2-thiazolidinethione methiodide is mixed with distilled water, containing 5% acetone and 0.01% Triton X-155, at a concentration of 1000 p.p.m. Five ml. of the test formulation are put in each of 4 test tubes. To each test tube is added one of the organisms: *Erewenia amylovora, Xanthomonas phaseoli, Staphylococcus aureus* and *Escherichia coli* in the form of a bacterial suspension in a saline solution from potato-dextrose agar plates. The tubes are then incubated for 4 hours at 30° C. Transfers are then made to sterile broth with a standard 4 mm. loop and the thus-innoculated broth incubated for 48 hours at 37° C. when growth is rated as follows: $A$=no growth, $B$=slight, $C$=moderate and $D$=heavy growth.

Using the above procedure, with the 2-thiazolidinethione methiodide, ratings of B, B, B, and C, respectively are obtained against the above four organisms, thus indicating a high degree of bactericidal activity.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of regulating plant growth which comprises employing as a plant growth regulant, in an amount sufficient to effect the desired regulation, a 2-thiazolidinethione alkhalide, the alkyl substituent of which is a lower alkyl.

2. The method of regulating plant growth which comprises employing as a plant growth regulant, in an amount sufficient to effect the desired regulation, a 2-thiazolidinethione methhalide.

3. The method of regulating plant growth which comprises employing as a plant growth regulant, in an amount sufficient to effect the desired regulation, a 2-thiazolidinethione methiodide.

References Cited in the file of this patent
UNITED STATES PATENTS 2,860,962   Bluestone _____ Nov. 18, 1958